N. B. CONVERSE.
FRUIT SEEDING CYLINDER.
APPLICATION FILED MAR. 13, 1908.
1,051,804.
Patented Jan. 28, 1913.
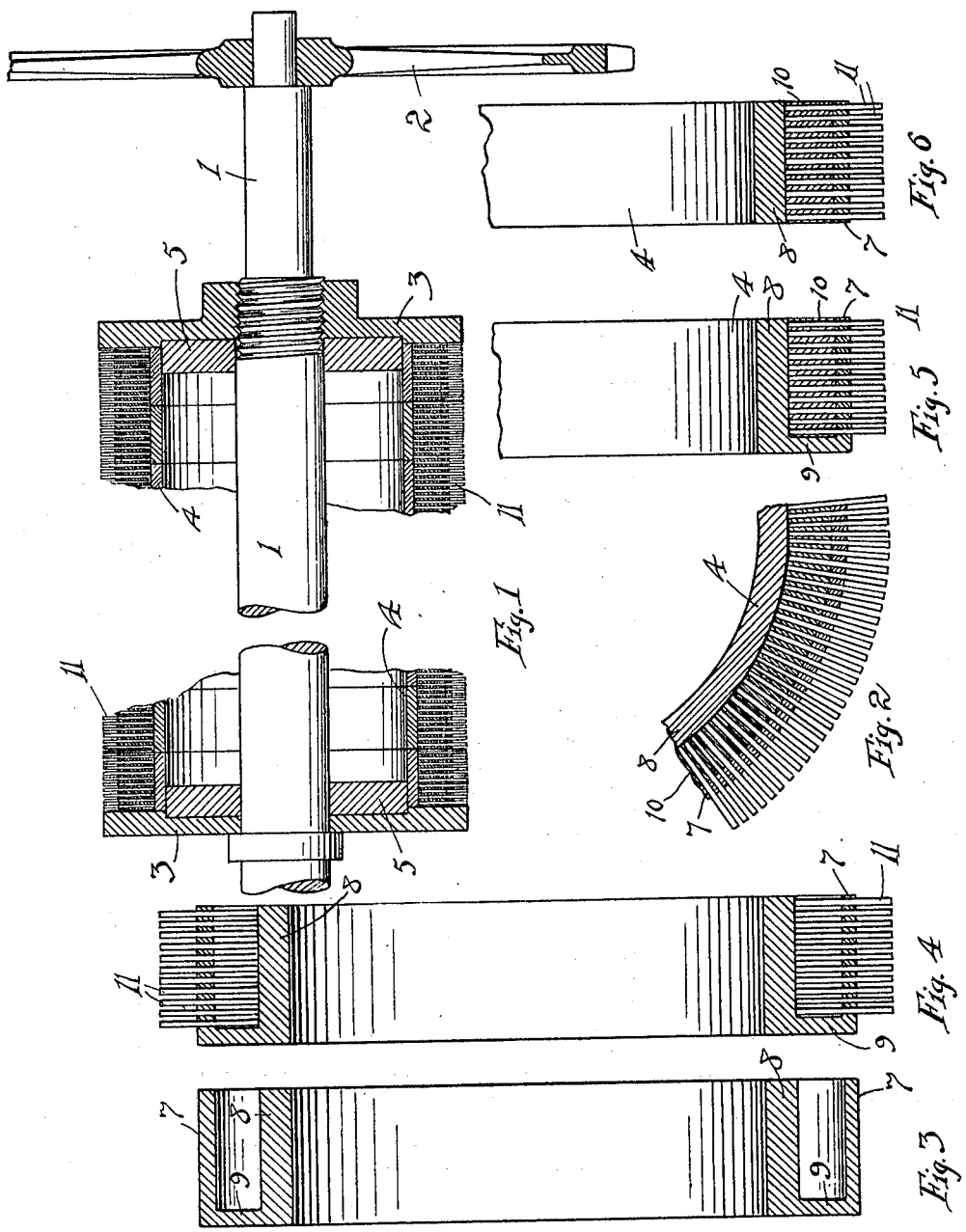
WITNESSES:
INVENTOR,
N. B. Converse
BY
F. M. Wright
ATTORNEY.

UNITED STATES PATENT OFFICE.

NEWTON B. CONVERSE, OF FRESNO, CALIFORNIA, ASSIGNOR TO NEWTON B. CONVERSE, J. E. DICKINSON, FRANCIS M. WRIGHT, B. W. NORTON, L. Z. ICKES, AND K. ARAKELIAN, TRUSTEES.

FRUIT-SEEDING CYLINDER.

1,051,804. Specification of Letters Patent. Patented Jan. 28, 1913.

Application filed March 13, 1908. Serial No. 420,823.

*To all whom it may concern:*

Be it known that I, NEWTON B. CONVERSE, a citizen of the United States, residing at Fresno, in the county of Fresno and State of California, have invented new and useful Improvements in Fruit-Seeding Cylinders, of which the following is a specification.

The object of the present invention is to provide an improved cylinder for seeding raisins and other fruit.

Raisins are seeded by being impaled upon a revolving cylinder having a large number of closely set fine teeth, which, piercing the raisins, extrude their seeds, which seeds are then removed from the cylinder, and the raisins, thus freed from the seeds, are then removed from the cylinder at a subsequent point in its revolution.

The object of the present invention is to provide a raisin seeding cylinder, which can be made and renewed at less cost than those at present in use and which will also do better work.

In the accompanying drawing, Figure 1 is a broken longitudinal sectional view of a fruit seeding cylinder constructed in accordance with the invention; Fig. 2 is an enlarged broken cross-sectional view of a portion of the cylinder; Fig. 3 is an axial section of one of the cylinder sections at the initial stages of making the same; Fig. 4 is a similar view at subsequent stage; Fig. 5 is a broken similar view at another subsequent stage; Fig. 6 is a similar view of the section complete.

Referring to the drawing, 1 indicates the shaft of the cylinder rotated by a gear wheel 2 in the usual manner.

3 indicates the cylinder heads, between which heads are clamped cylinder sections 4, and in recesses in which heads are the circular end supports 5.

The cylinder sections 4 are formed in the following manner, particular reference being made to Figs. 3, 4, 5 and 6: First, a body of a suitable metal of low fusibility is formed, having a comparatively thin outer shell 7, an inner shell 8 of greater thickness, and a connecting wall 9, as shown in Fig. 3. Next, holes are drilled or otherwise formed in the outer shell 7, care being taken that said holes are formed in rings the proper distance apart and at the proper distance in each ring. Wire teeth 11 are then inserted through said holes, and, when being so inserted, are driven in with sufficient force that their inner ends engage the outer surface of the inner shell as shown in Fig. 4. Then as shown in Fig. 5, the annular space between the two shells and around the base of the teeth is filled with a suitable liquid or plastic substance 10 which can be readily solidified. For this purpose, I prefer a mixture of sulfur and resin, in the proportions of 4 parts of sulfur to 7 parts of resin which proportion may be varied as experience may demand. However, other substances could be used, such as shellac dissolved in alcohol, rubber compounds, or the like. The substance is then allowed to harden, the treatment varying with the substance used. The connecting wall 9 is then cut off, and the sides of the section are carefully trimmed as shown in Fig. 6, so that, when placed in position in the cylinder, the outer rings of teeth will be properly spaced from the rings of the next sections. The cylinder is preferably made up of a number of such sections, say, one inch wide, so that, in case of a breakage of teeth in the cylinder, which breakage occurs among teeth arranged in a circumferential direction, one or two sections of the cylinder may be removed and replaced by new ones without the necessity of replacing the whole cylinder. This cylinder is very inexpensive, as the body of the cylinder can be melted and used over again, the cost of the pins themselves is inconsiderable, and the labor required is not great, as the holes are drilled and the teeth inserted by machinery. Also a cylinder of this character does better work than one made of saws, as the pins, being made of wire, may be made somewhat smaller and still have the same strength as the saw teeth cut out of sheet metal.

In making the circular saws, as is now the practice, sheet steel must be used of a grade of toughness considerably less than that of wire such as is used in this invention, in order that the toothing punch, in forming the saw, will stand the service. The punches and dies used in making raisin cylinder saws are a continual source of great expense. Moreover the operation of punching the saws crystallizes the sheet steel, thus weakening it and shortening its life. Because the pins can be made smaller and still have the same strength as the saw teeth, they lacerate the raisins less.

I claim:—

A cylinder comprising inner and outer metallic shells spaced from one another a uniform distance, and a connecting wall between said shells, the outer shell having uniformly spaced perforations, a single metallic pin through each perforation, and a filling in the space contained by the shells and the connecting wall, and closely compacted around the bases of the pins.

In testimony whereof I have hereunto set my hand in the presence of two subscribing witnesses.

NEWTON B. CONVERSE.

Witnesses:
F. M. WRIGHT,
D. B. RICHARDS.

Copies of this patent may be obtained for five cents each, by addressing the "Commissioner of Patents, Washington, D. C."